US012798865B2

(12) United States Patent
Kufahl et al.

(10) Patent No.: US 12,798,865 B2
(45) Date of Patent: Nov. 17, 2026

(54) CAPSULE FOR METERED POWDER DISPENSING

(71) Applicant: K & A Investments LLC, Colgate, WI (US)

(72) Inventors: Brian P. Kufahl, Colgate, WI (US); Marvin J. Zellmer, New Berlin, WI (US)

(73) Assignee: K & A Investments LLC, Colgate, WI (US)

( * ) Notice: Subject to any disclaimer, the term of this patent is extended or adjusted under 35 U.S.C. 154(b) by 270 days.

(21) Appl. No.: 18/390,756

(22) Filed: Dec. 20, 2023

(65) Prior Publication Data

US 2024/0228151 A1 Jul. 11, 2024

Related U.S. Application Data

(60) Provisional application No. 63/437,416, filed on Jan. 6, 2023.

(51) Int. Cl.

| | |
|---|---|
| ***B65D 83/06*** | (2006.01) |
| ***B65D 43/02*** | (2006.01) |
| ***B65D 51/24*** | (2006.01) |
| ***G01F 11/46*** | (2006.01) |

(52) U.S. Cl.

CPC ......... *B65D 83/06* (2013.01); *B65D 43/0202* (2013.01); *B65D 51/24* (2013.01); *G01F 11/46* (2013.01); *B65D 2543/00092* (2013.01)

(58) Field of Classification Search

None

See application file for complete search history.

(56) References Cited

U.S. PATENT DOCUMENTS

| | | | | | |
|---|---|---|---|---|---|
| 1,333,051 | A * | 3/1920 | Young | B65F 1/10 | 220/252 |
| 2,053,631 | A * | 9/1936 | Punte | B65D 47/268 | 222/443 |
| 2,104,332 | A * | 1/1938 | Rohde | G01F 11/24 | 222/363 |
| 2,533,449 | A * | 12/1950 | Fraser | G01F 11/24 | 222/364 |
| 3,312,377 | A * | 4/1967 | Chuhran | A47G 19/34 | 222/359 |

(Continued)

FOREIGN PATENT DOCUMENTS

| | | | |
|---|---|---|---|
| KR | 200468899 | 9/2013 | |
| WO | WO-2004062716 A1 * | 7/2004 | A61M 15/0048 |

*Primary Examiner* — Paul R Durand

*Assistant Examiner* — Michael J. Melaragno

(74) *Attorney, Agent, or Firm* — Wong Meyer Smith & McConnell

(57) ABSTRACT

A dispensing capsule provides metered dispensing of powder from a large storage tub or smaller travel container to a shaker bottle or a water bottle. The dispensing capsule may be releasably attached to a protein tub lid or smaller travel container lid, which provides a metering of powder (without the need for a scooper) from the protein tub or smaller travel container and a dispensing of the metered powder into a shaker bottle or water bottle (without the need for a scooper). As well as being used as a metering device, the dispensing capsule doubles as a single serving storage container that can be more easily transported for later dispensing to a shaker bottle or water bottle at the location of consumption.

15 Claims, 8 Drawing Sheets

(56) References Cited

U.S. PATENT DOCUMENTS

| | | | | | |
|---|---|---|---|---|---|
| 3,318,491 | A * | 5/1967 | Williamson | B65D 83/0409 | 222/542 |
| 4,102,477 | A * | 7/1978 | Yoon | G01F 11/24 | 222/452 |
| 4,189,066 | A * | 2/1980 | Berghahn | B65D 83/0409 | 221/266 |
| 4,303,172 | A * | 12/1981 | Bosland | B65D 43/14 | 220/252 |
| 4,732,387 | A * | 3/1988 | Elinski | A63F 11/0002 | 273/144 A |
| 4,860,930 | A * | 8/1989 | Tu | G01F 11/24 | 222/231 |
| 5,169,036 | A * | 12/1992 | Tong | A47G 19/34 | 222/339 |
| 5,255,829 | A * | 10/1993 | Trumstedt | B65D 83/06 | 222/363 |
| 5,275,298 | A | 1/1994 | Holley, Jr. et al. | | |
| 6,164,485 | A * | 12/2000 | Hilton | B65D 51/28 | 220/709 |
| 6,766,924 | B1 * | 7/2004 | Ophardt | G01F 11/24 | 222/368 |
| 6,776,315 | B1 * | 8/2004 | Laulom | A47J 43/27 | 215/DIG. 8 |
| 6,920,991 | B2 * | 7/2005 | Holley, Jr. | B65D 81/3205 | 215/11.4 |
| 8,777,044 | B1 * | 7/2014 | Raymus | B65D 81/3205 | 222/129 |
| 9,272,827 | B2 * | 3/2016 | Marina | A23L 2/52 | |
| 10,173,825 | B1 | 1/2019 | Ercole | | |
| 10,457,475 | B2 * | 10/2019 | Nickerson | B65D 83/049 | |
| 2010/0072160 | A1 | 3/2010 | Hayes | | |
| 2011/0101023 | A1 * | 5/2011 | Chan | G01F 11/20 | 222/359 |
| 2011/0163118 | A1 | 7/2011 | Gieda et al. | | |
| 2013/0299519 | A1 * | 11/2013 | Gold | G01F 11/003 | 222/368 |
| 2015/0246742 | A1 * | 9/2015 | Gold | B65D 83/06 | 222/369 |
| 2016/0109273 | A1 * | 4/2016 | LaFosse | G01F 11/24 | 222/71 |
| 2018/0132652 | A1 * | 5/2018 | LaFosse | G01F 11/24 | |
| 2020/0126343 | A1 * | 4/2020 | Kingswell | G07F 13/02 | |
| 2020/0307877 | A1 * | 10/2020 | Powell | B65D 51/2807 | |
| 2024/0228151 | A1 * | 7/2024 | Kufahl | B65D 51/24 | |

* cited by examiner

CAPSULE FOR METERED POWDER DISPENSING

CROSS REFERENCE TO RELATED APPLICATION

This application claims the benefit of U.S. Provisional Patent Application No. 63/437,416, filed Jan. 6, 2023, which is incorporated by reference herein in its entirety.

BACKGROUND OF THE INVENTION

The present invention relates to dispensing capsules for powder and, in particular, to a dispensing capsule for use with portable containers for transferring powder.

Protein powders are typically stored in large, air-tight storage tubs or bags. The large storage tubs or bags may contain dozens of servings. Protein powders are typically mixed with chilled milk or water within a shaker or water bottle and consumed. When the protein powders are used on-the-go, a single serving of powder may be transferred to a portable container that can be more easily transported to the location of use prior to being mixed with milk or water for consumption.

Typically, a scooper or similar measuring device is used to dispense a single serving of protein powder e.g., one, two, or more scoops, from the large storage tub or bag for transfer directly into a cup, shaker bottle or to a smaller portable container to be dispensed later into a shaker or water bottle. However, it can be difficult to transfer the protein powder from the large storage tub or bag conveniently and without inadvertent spilling powder.

SUMMARY OF THE INVENTION

The present invention functions as a dispensing capsule providing metered dispensing of powder from a large storage tub or smaller travel container to a shaker bottle or a water bottle. The dispensing capsule may be releasably attached to a protein tub lid or smaller travel container lid, which provides a metering of powder (without the need for a scooper) from the protein tub or smaller travel container and a dispensing of the metered powder into a shaker bottle or water bottle (without the need for a scooper). As well as being used as a metering device, the dispensing capsule doubles as a single serving storage container that can be more easily transported for later dispensing to a shaker bottle or water bottle at the location of consumption.

The present invention provides a powder dispensing assembly comprising a first shell, a second shell joinable to the first shell to define a volume and the second shell having a flow opening, and a shroud rotatable about a pivot point on the second shell to cover the flow opening in a first position and to reveal the flow opening in a second position.

It is thus a feature of at least one embodiment of the present invention to permit the rotation of the first and second shell of the capsule to open and close the powder dispensing capsule opening.

The shroud may have a shroud opening with a dimension corresponding to a dimension of the flow opening.

It is thus a feature of at least one embodiment of the present invention to allow the flow opening to be progressively opened upon rotation of the two halves with respect to each other.

The shape of the shroud may conform to an inner surface of the second shell. The inner surface of the second shell may be concave. The first shell and second shell may form a sphere.

It is thus a feature of at least one embodiment of the present invention to allow the sphere to sit naturally within a seat of the container opening while maximizing the container volume within the sphere.

The shroud may be joined to the second shell by a hole receiving a corresponding peg.

It is thus a feature of at least one embodiment of the present invention to allow for ease of assembly and free rotation of the halves.

The shroud may be confined to rotate less than or equal to 120 degrees.

It is thus a feature of at least one embodiment of the present invention to allow for the opening and closing of the flow opening by a quick 120 degree hand rotation.

The interior of the second shell may have opposing stop blocks restraining rotational movement of the shroud.

It is thus a feature of at least one embodiment of the present invention to prevent over rotation and to indicate fully open and fully close position through resistance of the shroud against the stop blocks.

The shroud may have a toothed edge engaging with mating notches on an interior of the first shell.

It is thus a feature of at least one embodiment of the present invention to permit rotation of the shroud through manual rotation of the shell halves.

The rotation of the first shell with respect to the second shell rotates the shroud about the pivot point between the first position and second position.

It is thus a feature of at least one embodiment of the present invention to rotate the shell halves through clockwise and counter-clockwise rotation of one of the halves with respect to the stationary half engaging with the lid.

A lid of a container may have a lid opening and removably receive the second shell within the lid opening of the lid.

It is thus a feature of at least one embodiment of the present invention to provide a specialized lid permitting the removable attachment of the capsule to the container.

Release buttons may extend outwardly from the lid and pressable to release the second shell from the lid.

It is thus a feature of at least one embodiment of the present invention to lock the capsule to the lid to prevent accidental removal of the capsule when the container is inverted and shook to move powder.

A sifter may be coupled to the bottom of the lid.

It is thus a feature of at least one embodiment of the present invention to assist with the flow of powder into the capsule volume and prevent clumping.

An alternative embodiment of the present invention provides a method of dispensing powder comprising the steps of providing a powder dispensing assembly comprising a first shell, a second shell joinable to the first shell to define a volume and the second shell having a flow opening, and a shroud rotatable about a pivot point on the second shell to cover the flow opening in a first position and to reveal the flow opening in a second position; attaching the powder dispensing assembly to a powder container; rotating the shroud to the second position to reveal the flow opening; filling the volume with powder; and rotating the shroud to the first position to cover the flow opening;

It is thus a feature of at least one embodiment of the present invention to allow for powder to be dispensed into a capsule provided by the first and second shell.

The method may further comprise attaching the powder dispensing assembly to a lid of the powder container having a lid opening and rotating the shroud to the second position to reveal the flow opening permitting the flow of powder from the powder container to the volume.

It is thus a feature of at least one embodiment of the present invention to facilitate the transport of premeasured, single serving of powder to a capsule container.

The method may further comprise rotating the shroud to the first position to cover the flow opening and removing the powder dispensing assembly from the lid of the powder container. The method may further comprise pressing release buttons extending outwardly from the lid to release the powder dispensing assembly from the lid.

It is thus a feature of at least one embodiment of the present invention to invert the capsule and fill the capsule without spilling powder or using scoopers.

The method may further comprise rotating the shroud to the second position to reveal the flow opening and dispensing powder from the powder.

It is thus a feature of at least one embodiment of the present invention to allow the capsule to dispense a predetermined amount, single serving powder into a cup, shaker bottle, or water bottle.

The present invention uniquely eliminates any direct contact with the powder during the entire process of transferring powder from its source container to the final liquid mixing container (i.e., cup, shaker bottle, or water bottle).

These particular objects and advantages may apply to only some embodiments falling within the claims and thus do not define the scope of the invention.

DETAILED DESCRIPTION OF THE PREFERRED EMBODIMENT

Figure 1:
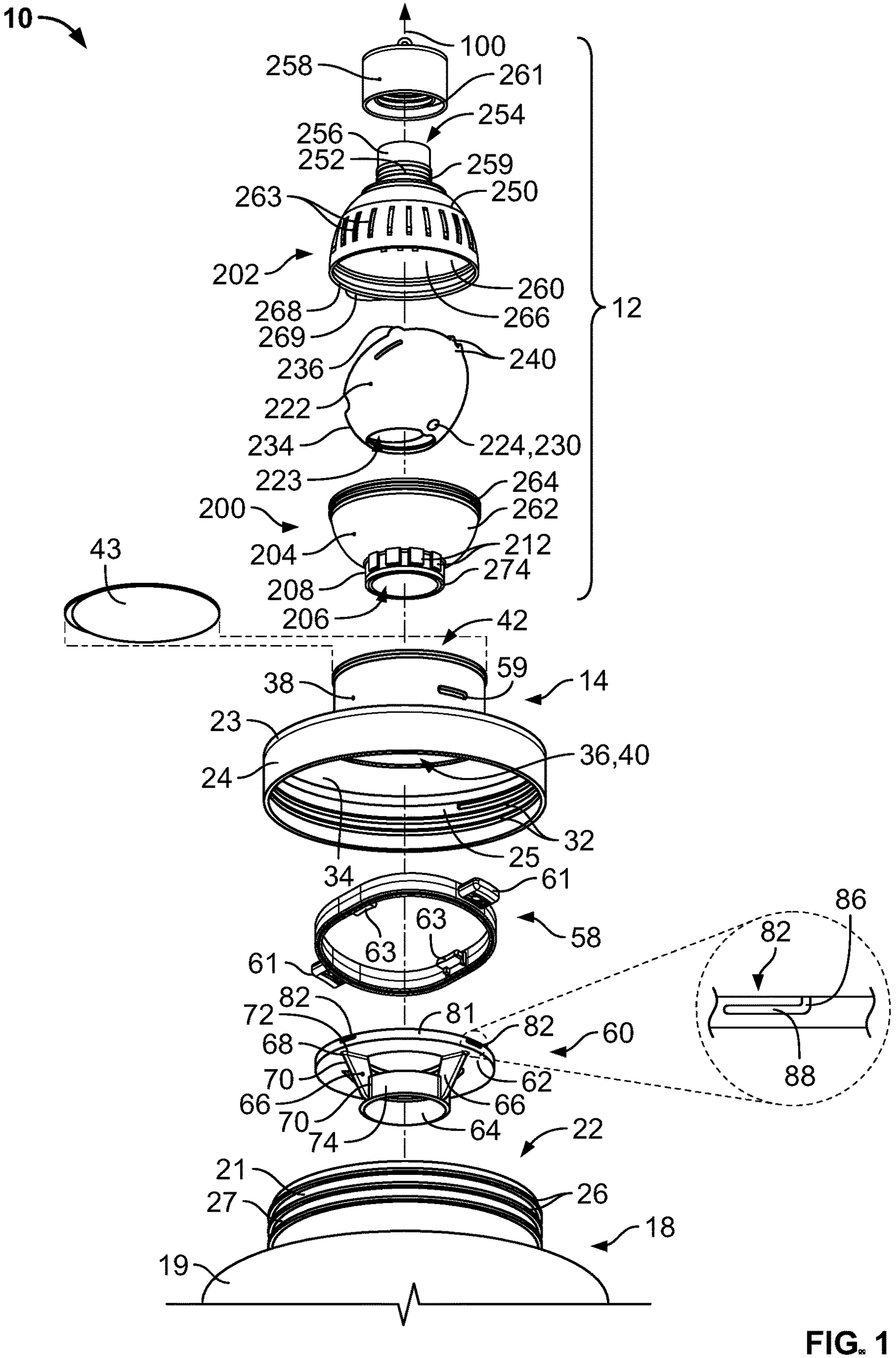
FIG. 1 is an exploded, perspective view of one embodiment of a powder dispensing assembly showing a dispensing capsule releasably attachable to a powder tub lid of the present invention.

Referring to FIGS. 1 through 4, a powder dispensing assembly 10 includes a powder dispensing capsule 12 providing releasable attachment to one or more container lids 14, 16 (large and small size) of the powder dispensing assembly 10 that may be releasably connected to containers 18, 20 (large and small size), respectively, by a user. In this respect, the powder dispensing assembly 10 allows containers 18, 20 to be adapted with the container lids 14, 16 of the powder dispensing assembly 10 so that the powder dispensing capsule 12 may be easily attached to extract powder from the large container 18 or small travel container 20 and transfer the metered amount of powder to a shaker or water bottle without scoops and while minimizing powder spills.

Bulk Container Dispensing

Figure 2:
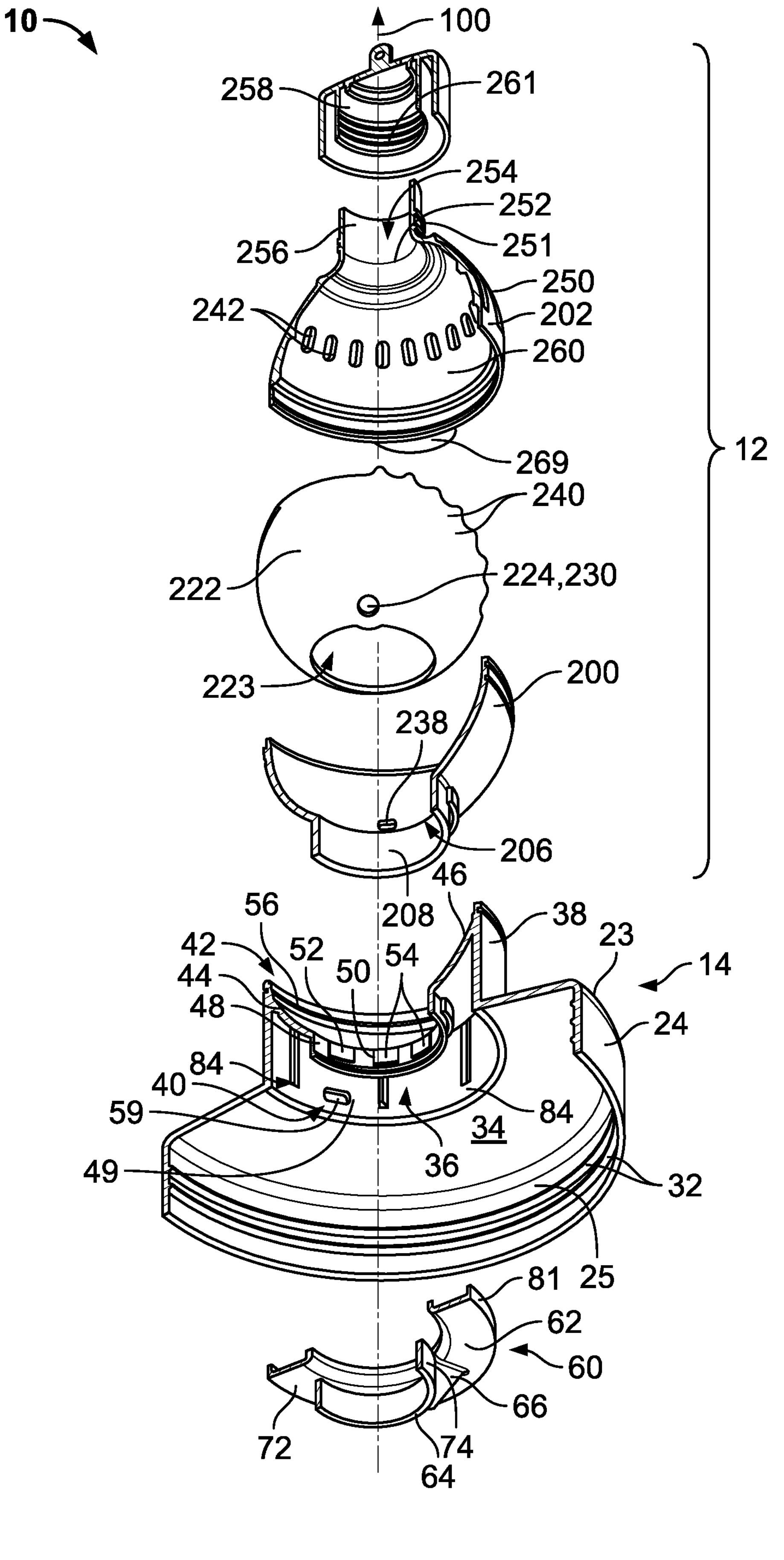
FIG. 2 is an exploded, perspective cross-sectional view of the powder dispensing assembly of FIG. 1.

Referring to FIGS. 1 and 2, in one embodiment of the present invention, a large container 18 holding large bulk amounts of powder for dispensing and suitable for this purpose is a commercially available protein powder tub, for example, 18 oz to 32 oz tub of protein powder as known in the prior art. The typical powder tub includes a cylindrical sidewall 19 with an upwardly extending lip 21 extending upwardly from the cylindrical sidewall 19 and forming a large upwardly exposed circular opening 22 allowing the powder to be removed from the powder tub therethrough and receiving the large tub container lid 14 of the assembly 10. The large tub container lid 14 is sized to extend around the upwardly extending lip 21 and over the large upwardly exposed circular opening 22. The large upwardly exposed circular opening 22 may have an outer diameter between 4 to 6 inches and may be approximately 4.5 inches. Exemplary commercially available protein powder tubs include powder tubs holding whey protein, casein protein, egg protein, pea protein, hemp protein, brown rice protein, and mixed plant protein as known in the prior art. It is also understood that the powder tubs may hold other types of powders besides protein powder such as infant formula.

The large tub container lid 14 of the powder dispensing assembly 10 is defined by a cylindrical sidewall 24 extending around the upwardly extending lip 21 of the large upwardly exposed circular opening 22 of the large container 18, and a top wall 34 extending horizontally at a top edge 23 of the cylindrical sidewall 24 to enclose the large upwardly exposed circular opening 22. The cylindrical sidewall 24 of the large tub container lid 14 provides an inner surface 25 supporting an inwardly extending screw thread 32, which is configured to be manually screw attached to a corresponding screw thread 26 of an outer surface 27 of the upwardly extending lip 21 of the large upwardly exposed circular opening 22 of the large container 18. In certain embodiments, the screw thread 32 of the large tub container lid 14 and the corresponding screw thread 26 of the large container 18, respectively, are continuous threads providing a "screw-on" lid, and alternatively, are multiple threads to provide a "twist-off" lid, as known in the prior art. It is understood that other attachment methods between the large tub container lid 14 and the large container 18 are contemplated such as adhesive, clamps, snap fit, snap rings, compression pins, compression fit, and the like.

The top wall 34 of the large tub container lid 14 encloses the top edge 23 of the cylindrical sidewall 24 to form a cylindrical shaped cap or cover. The top wall 34 of the large tub container lid 14 supports a top wall hole 36 substantially centered within the top wall 34 allowing powder to be dispensed from the large container 18 but is smaller than the large upwardly exposed circular opening 22 to funnel the powder into a smaller area opening. The top wall hole 36 is approximately 25%-75% and approximately 50% less than the area of the large upwardly exposed circular opening 22 to reduce the size of the upper opening of the large container

18. The top wall hole 36 may have an outer diameter between 0.75 to 3 inches and may be approximately 1.5 inches.

Extending upwardly from the top wall 34 is a cylindrical tube 38 forming a conduit for powder from the large container 18 to flow outwardly through the top wall hole 36 and into the cylindrical tube 38 along a powder flow axis 100. A lower opening 40 of the cylindrical tube 38 may, in some embodiments, be sized to receive the top wall hole 36 and therefore may have a similar diameter as the top wall hole 36 as seen in FIGS. 1 and 2, and in other embodiments may be sized to be larger than the top wall hole 36 and therefore be attached to the top wall 34 and surround the top wall hole 36. An upper opening 42 of the cylindrical tube 38 may be configured to receive the dispensing capsule 12 as further described below. When the dispensing capsule 12 is not inserted into the upper opening 42, the upper opening 42 may be enclosed by a protective cover 43 (shown in FIG. 1) to selectively enclose the upper opening 42 and seal the powder within the large container 18. The cover 43 may be attached to the cylindrical tube 38 by snap fit or twist lock connection. The lower opening 40 and upper opening 42 may have an outer diameter between 1 to 3 inches and may be approximately 2 inches.

In some embodiments, the cylindrical tube 38 may support therein an internal funnel 44 that further assists with directing the powder from the lower opening 40 to the upper opening 42 of the cylindrical tube 38. The internal funnel 44 provides a wider tube 46 at the upper opening 42 and a narrower tube 48 at the lower opening 40. The wider tube 46 may have an outer diameter between 1 to 3 inches and may be approximately 2 inches. The narrower tube 48 may have an outer diameter between 1 to 3 inches and may be approximately 1 inch.

The wider tube 46 may be cone shaped and may provide a smooth inner surface 56 for receiving and supporting therein the dispensing capsule 12 as further described below. The narrower tube 48 may be cylindrical and may include an inner surface 50 supporting a circumferentially inwardly extending tongue 52 at a lower end and longitudinal extending notches 54 extending about an inner circumference of the narrower tube 48 above the circumferentially inwardly extending tongue 52, and which may assist with secure attachment of the dispensing capsule 12 within the cylindrical tube 38 as further described below.

The large tub container lid 14 may further support a lock ring 58 that is attached to the interior of the large tube container lid 14 by an interference fit. The lock ring 58 supports a pair of outwardly opposed release buttons 61 extending through holes 59 of the wall of the cylindrical tube 38 and allowing a user to press inwardly on the release buttons 61 compressing the lock ring 58 and causing inwardly extending tabs 63, positioned 90 degrees from the outwardly opposed release buttons 61, to release a circumferentially extending groove 274 of the dispensing capsule 12.

The large tub container lid 14 may further support a sifter 60 on a lower end assisting with the disruption and movement of powder outward from the large container 18, through the large upwardly exposed circular opening 22 of the large container 18 along the powder flow axis 100, and through the cylindrical tube 38. The sifter 60 provides a flat joining annulus 62 that is attachable to the lower opening 40 of the cylindrical tube 38, for example, by twist lock elements positioned on an inner surface 49 of the cylindrical tube 38. The flat joining annulus 62 may have an inner diameter of approximately 1 to 1.5 inches and an outer diameter of approximately 2 to 2.5 inches, therefore, having a thickness measured between the inner and outer diameter of approximately 0.5 to 1 inch. The flat joining annulus 62 may have a width measured along the powder flow axis 100 of approximately 0.1 to 0.3 inches. The cross section of the flat joining annulus 62 taken along a plane of the powder flow axis 100 may be U-shaped to provide upwardly extending sidewalls, with the outer sidewall forming an outer edge 81.

The flat joining annulus 62 further supports therebelow a cylindrical ring 64 connected to the flat joining annulus 62 by a set of ribs 66, for example, three ribs 66, spanning between and connecting the flat joining annulus 62 and the cylindrical ring 64. The set of ribs 66 are evenly spaced about a circumference of the flat joining annulus 62 and a circumference of the cylindrical ring 64 to join the flat joining annulus 62 to the cylindrical ring 64. Each of the ribs of the set of ribs 66 may generally take the form of a right triangle providing adjacent sides 68, 70 of the right triangle attached to a lower surface 72 of the flat joining annulus 62 and an outer surface 74 of the cylindrical ring 64, respectively, and a hypotenuse 76 of the right triangle extending outwardly between the flat joining annulus 62 to the cylindrical ring 64 forming a downwardly, inwardly sloping edge.

The cylindrical ring 64 may be supported below the flat joining annulus 62 by a separation distance of approximately 0.2 to 0.5 inches. The cylindrical ring 64 may have an inner diameter of approximately 0.5 to 1.5 inch and an outer diameter of approximately 0.5 to 1.5 inch, therefore, having a thickness measured between the inner and outer diameter of approximately 0.1 to 0.5 inch. The cylindrical ring 64 may have a width measured along the powder flow axis 100 of approximately 0.5 to 1 inch.

The sifter 60 is attachable to the large tub container lid 14 by twisting and locking the flat joining annulus 62 to the inner surface 49 of the cylindrical tube 38. In one embodiment, the outer edge 81 of the flat joining annulus 62 of the sifter 60 includes at least one L-shaped groove 82 (shown enlarged in FIG. 1) and may receive corresponding notches 84 of the inner surface 49 of the cylindrical tube 38 on a lower end. The L-shaped grooves 82 receive the notches 84 and lock the sifter 60 from being removed from the large tub container lid 14 along the powder flow axis 100 by first, inserting the notches 84 along the powder flow axis 100 and along a short arm 86 of the L-shaped grooves 82 and second, rotating the sifter 60 circumferentially and moving the notches 84 along the long arm 88 of the L-shaped grooves 82 to position the notches 84 inside the long arm 88 of the L-shaped grooves 82. Therefore, the sifter 60 is locked from being removed along the powder flow axis 100 by capturing the notches 84 within the long arm 88 of the L-shaped grooves 82. It is understood that the sifter 60 may be attached to the large tub container lid 14 by other known removable attachment methods such as screw threads, snap fit, press fit/interference fit, adhesives and tapes, and the like.

Travel Container Dispensing

Figure 3:
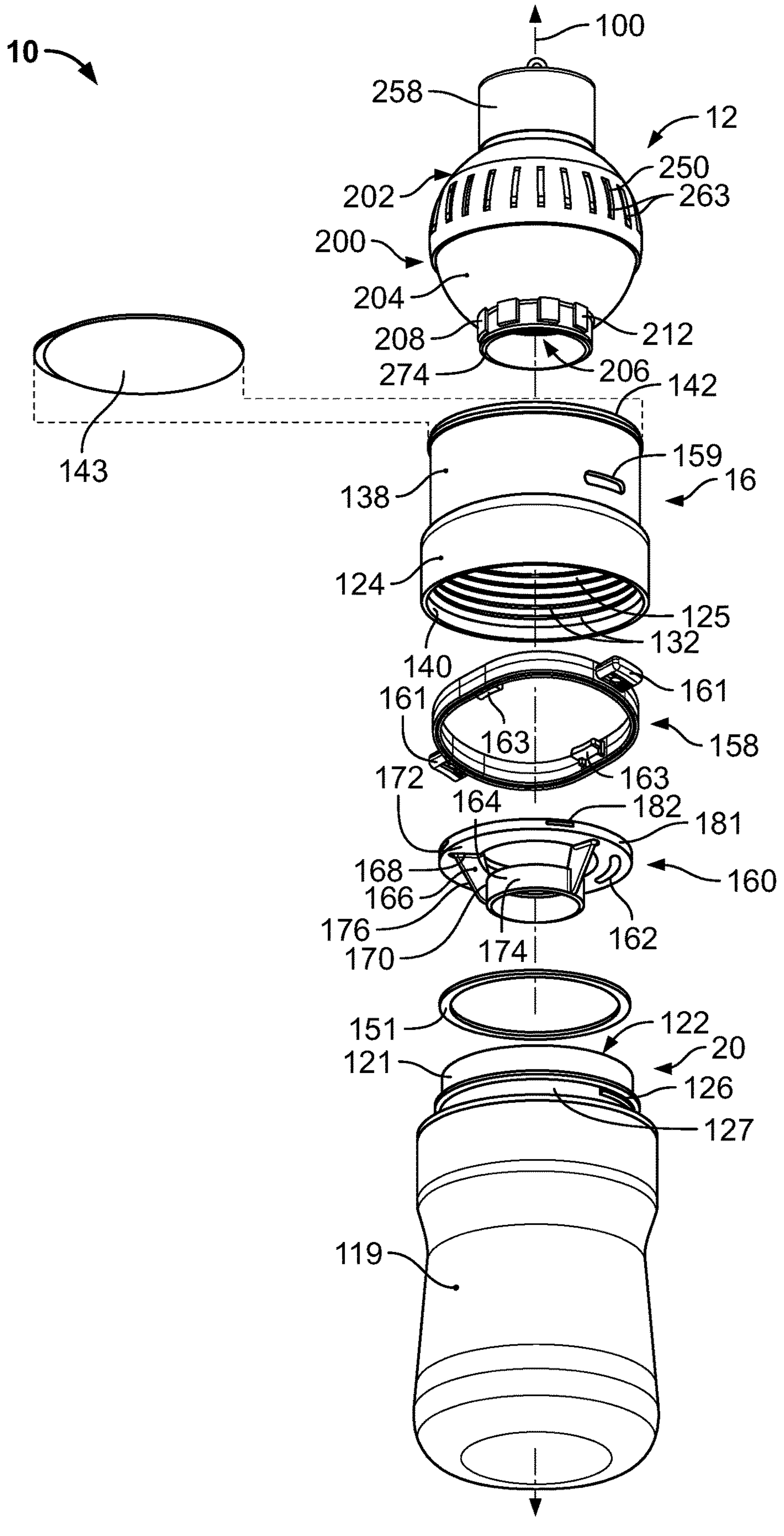
FIG. 3 is an exploded, perspective view of an alternative embodiment of a powder dispensing assembly showing a dispensing capsule releasably attachable to a travel container lid of the present invention.
Figure 4:
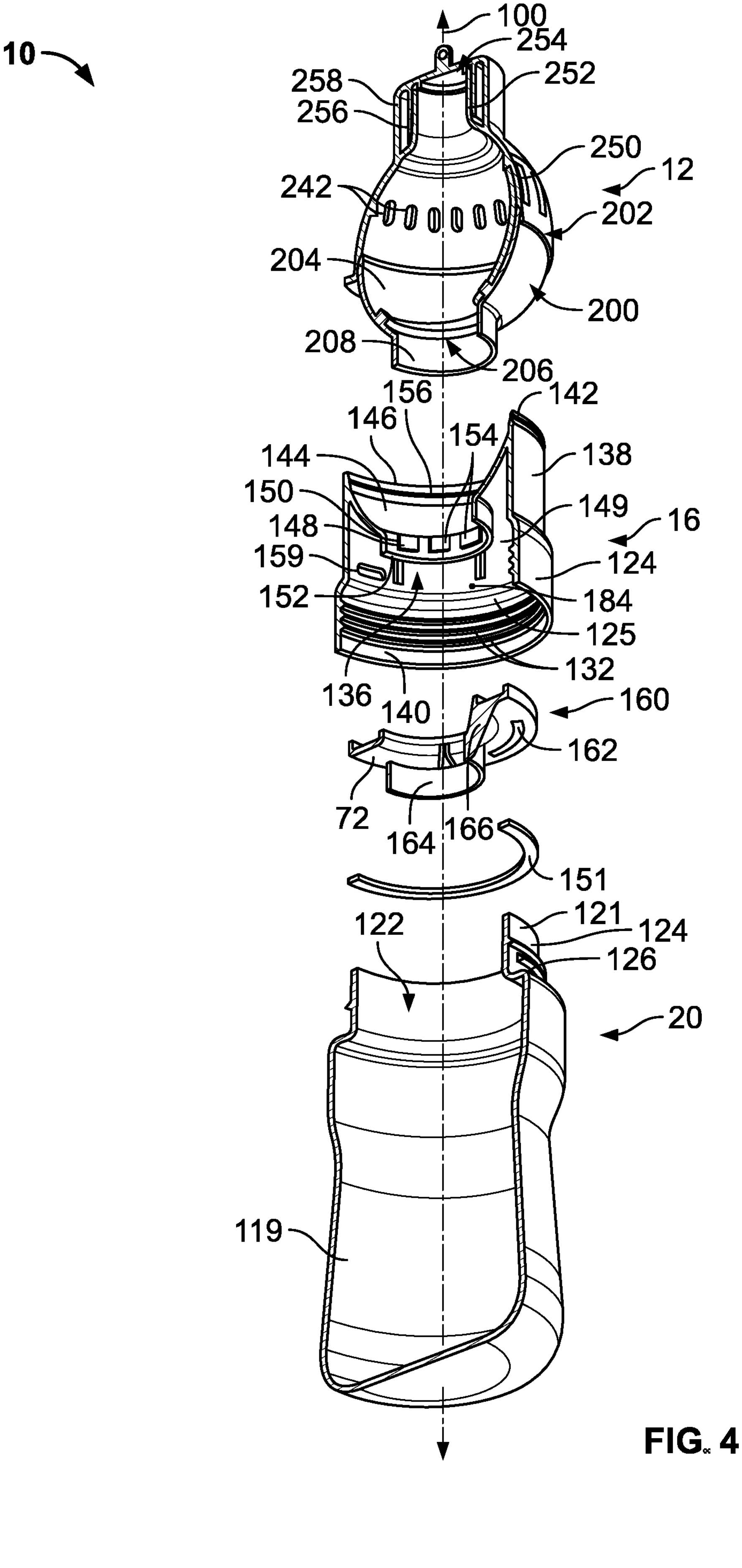
FIG. 4 is an exploded, perspective cross-sectional view of the powder dispensing assembly of FIG. 3.

Similar to FIGS. 1 and 2, and referring now to FIGS. 3 and 4, an alternative embodiment of the present invention provides a small travel container 20 receiving powder from the protein powder tub and which may hold smaller bulk amounts of powder than the protein powder tub, for example, holding multiple servings of powder such as one week's worth of powder. The bottle has a cylindrical sidewall 119 with an upwardly extending lip 121 forming a small upwardly exposed circular opening 122 allowing the powder to be removed from the small travel container 20 therethrough and receiving the small container lid 16 of the alternative embodiment of the assembly 10. The small container lid 16 is sized to extend around the upwardly extending lip 121 and over the small upwardly exposed circular opening 122. The small upwardly exposed circular opening 122 may have an outer diameter between 2 to 3 inches and may be approximately 2.5 inches. The small travel container 20 may be a wide mouth bottle receiving powder from the protein powder tub which may be dispensed using scoops as conventionally known. The small travel container 20 may be a proprietary bottle that is sized to fit the small container lid 16.

The small container lid 16 of the powder dispensing assembly 10 is defined by a cylindrical sidewall 124 extending around the upwardly extending lip 121 of the small upwardly exposed circular opening 122 of the small travel container 20. The cylindrical sidewall 124 of the small container lid 16 provides an inner surface 125 supporting an inwardly extending screw thread 132, which is configured to be manually screw attached to a corresponding screw thread 126 of an outer surface 127 of the upwardly extending lip 121 of the small upwardly exposed circular opening 122 of the small travel container 20. In certain embodiments, the screw thread 132 of the small container lid 16 and the corresponding screw thread 126 of the small travel container 20, respectively, are continuous threads providing a "screw-on" lid, and alternatively, are multiple threads to provide a "twist-off" lid, as known in the prior art. It is understood that other attachment methods between the small container lid 16 and the small travel container 20 are contemplated such as adhesive, clamps, snap fit, snap rings, compression pins, compression fit, and the like.

Extending upwardly from the cylindrical sidewall 124 is an upwardly extending cylindrical tube 138 forming a conduit for powder to flow from the small travel container 20 to flow outwardly through the top wall hole 136 and into the cylindrical tube 138 along the powder flow axis 100. A lower opening 140 of the cylindrical tube 138 may be sized to receive the cylindrical sidewall 124 and therefore may have a similar diameter as the cylindrical sidewall 124. An upper opening 142 of the cylindrical tube 138 may be configured to receive the dispensing capsule 12 as further described below. When the dispensing capsule 12 is not inserted into the upper opening 142, the upper opening 142 may be enclosed by protective cover 143 (shown in FIG. 3) to selectively enclose the upper opening 142 and seal the powder within the small travel container 20. The cover 143 may be attached to the cylindrical tube 138 by snap fit or twist lock connection. The lower opening 140 and upper opening 142 may have an outer diameter between 1 to 3 inches and may be approximately 2 inches.

In some embodiments, the cylindrical tube 138 may support therein an internal funnel 144 that further assists with directing the powder from the lower opening 140 to the upper opening 142 of the cylindrical tube 138. The internal funnel 144 provides a wider tube 146 at the upper opening 142 and a narrower tube 148 at the lower opening 140. The wider tube 146 may have an outer diameter between 1 to 3 inches and may be approximately 2 inches. The narrower tube 148 may have an outer diameter between 1 to 3 inches and may be approximately 1 inch.

The wider tube 146 may be cone shaped and may provide a smooth inner surface 156 for receiving and supporting therein the dispensing capsule 12 as further described below. The narrower tube 148 may be cylindrical and may include an inner surface 150 supporting a circumferentially inwardly extending tongue 152 at a lower end and longitudinal extending notches 154 extending about the axis 100, which may assist with secure attachment of the dispensing capsule 12 to the cylindrical tube 138 as further described below.

The small container lid 16 may further support a lock ring 158 that is attached to the interior of the small container lid 16 by an interference fit. The lock ring 158 supports a pair of outwardly opposed release buttons 161 extending through the holes 159 of wall of the cylindrical tube 138 and allowing a user to press inwardly on the release buttons 161 compressing the lock ring 158 and causing inwardly extending tabs 163, positioned 90 degrees from the outwardly opposed release buttons 161, to release the circumferentially extending groove 274 of the dispensing capsule 12.

The small container lid 16 may further support a sifter 160, similar to sifter 60 as described above with respect to FIGS. 1 and 2, assisting with the disruption and movement of powder outward from the small travel container 20, through the small upwardly exposed circular opening 122 of the small travel container 20 along the axis 100 and through the cylindrical tube 138. The sifter 160 provides a flat joining annulus 162 that is attachable to the inner surface 149 of the cylindrical tube 138 and may be manufactured and attached in a similar manner as described above. Optionally, a gasket 151 may be positioned between the sifter 160 and the upwardly extending lip 121 to seal the connection.

It is noted that the elements of the embodiment of the powder dispensing assembly 10 shown in FIGS. 3 and 4 are similar to the elements of the embodiment of the powder dispensing assembly 10 shown in FIGS. 1 and 2, with similar elements being denoted by the same reference number incremented by 100. Generally, the container lids 14, 16 have similar elements which allow the container lids 14, 16 to be attached to various sized containers 18, 20 and therefore, are adapted for use with different sizes of containers.

Powder Dispensing Capsule

Figure 5:
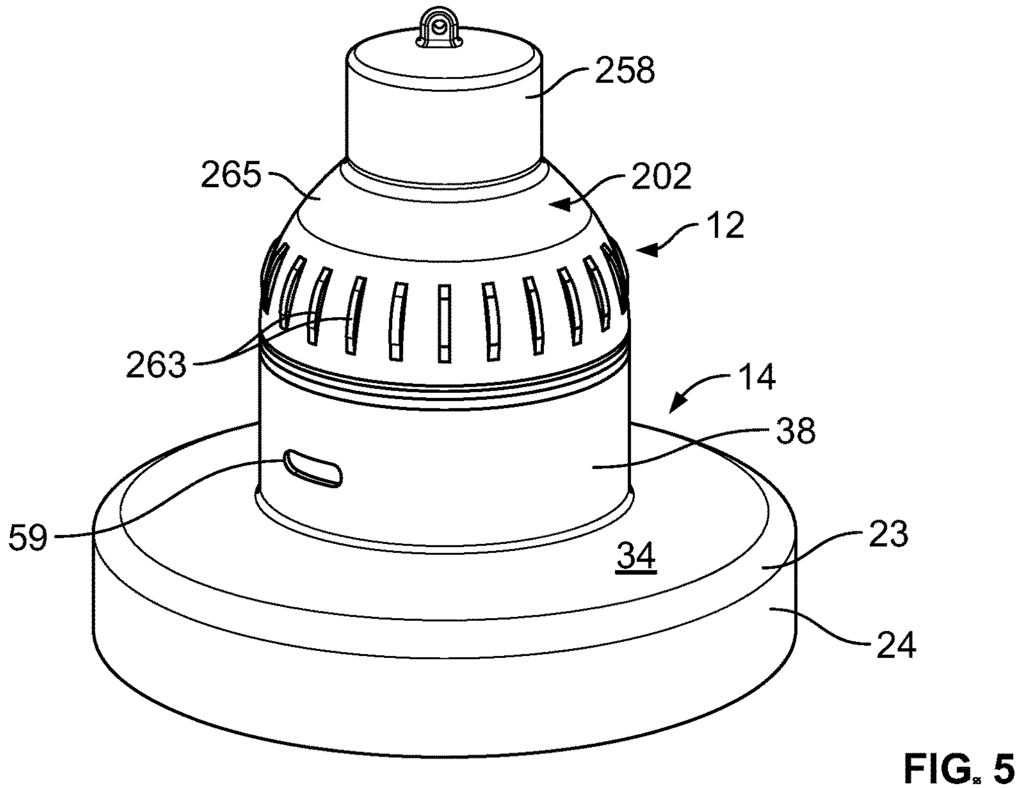
FIG. 5 is a perspective view of the dispensing capsule of the powder dispensing assembly of FIGS. 1-2 releasably attached to the powder tub lid.
Figure 6:
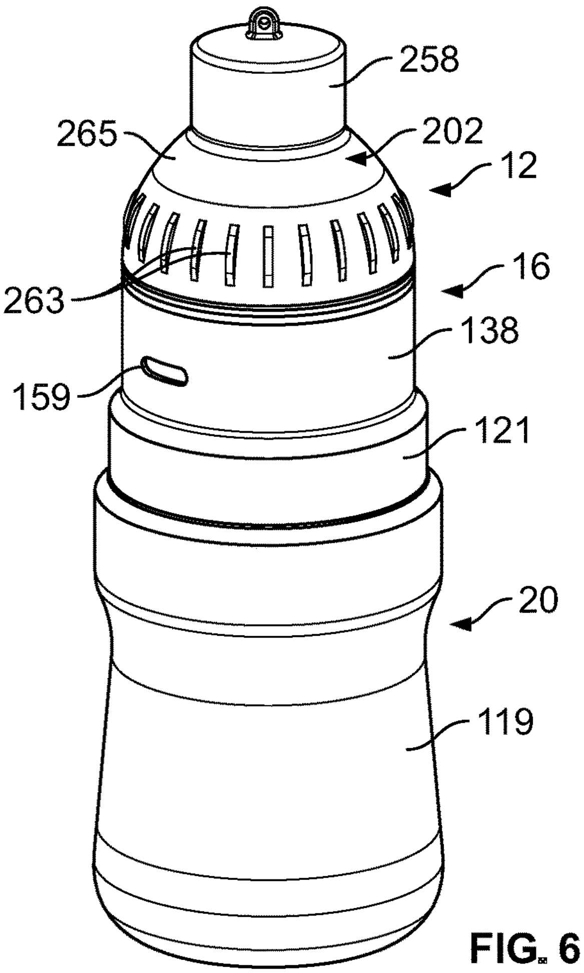
FIG. 6 is a perspective view of the dispensing capsule of the powder dispensing assembly of FIGS. 3-4 releasably attached to the travel container lid.

Referring now to FIGS. 5 and 6, the dispensing capsule 12 may be received by the large tub container lid 14 and the small container lid 16, respectively, and includes lower and upper halves 200, 202 which are coupled to form a generally spherical container for holding and transferring a solid powder. The lower half 200 of the dispensing capsule 12 may be configured to be received by the container lids 14, 16 while the upper half 202 is attachable to the lower half 200 and extends upwardly from the container lids 14, 16 as seen.

Referring now to FIGS. 1 through 4, and 7 and 8, the lower half 200 of the dispensing capsule 12 may comprise a hollow half sphere or lower spherical cap 204 that has a lower opening 206 centered on the lower apex and with a downwardly extending lip 208 extending downwardly from the lower opening 206 and forming a cylindrical conduit that is insertable inside the narrower tubes 48, 148 of the internal funnels 44, 144 of the cylindrical tubes 38, 138. An outer surface 210 of the downwardly extending lip 208 may support a plurality of teeth 212 (best seen in FIGS. 1 and 3) corresponding with the longitudinally extending notches 54, 154 of the narrower tubes 48, 148 of the internal funnels 44, 144 of the cylindrical tubes 38, 138 so that the teeth 212 of the downwardly extending lip 208 and the longitudinally extending notches 54, 154 of the narrower tube 48, 148, respectively, interlock to restrict rotational motion of the lower half 200 of the dispensing capsule 12 with respect to the cylindrical tube 38, 138 of the container lids 14, 16. The outer surface 210 of the downwardly extending lip 208 may also support the circumferentially extending groove 274 at a lower edge that may receive the circumferentially inwardly extending tongue 52, 152 of the narrower tube 48, 148 and outwardly opposed release buttons 161 of the lock ring 158 to lock the dispensing capsule 12 and restrict motion along the powder flow axis 100.

An interior surface 220 of the lower spherical cap 204 of the lower half 200 may support a shroud 222 that is attached to the interior surface 220 of the lower spherical cap 204 at a single pivot point 224 and that allows for rotation of the shroud 222 to selectively open or conceal the lower opening 206 of the downwardly extending lip 208. The shroud 222 is defined by a hollow half sphere or spherical cap, similar to the lower spherical cap 204, that is sized to fit and pivot within the lower spherical cap 204 in a sliding pivot connection. A shroud opening 223 is formed within the shroud 222 corresponding in size and shape to the lower opening 206 of the lower spherical cap 204 in order to allow the shroud opening 223 of the shroud 222 and the lower opening 206 of the lower spherical cap 204 to align.

Figure 7:
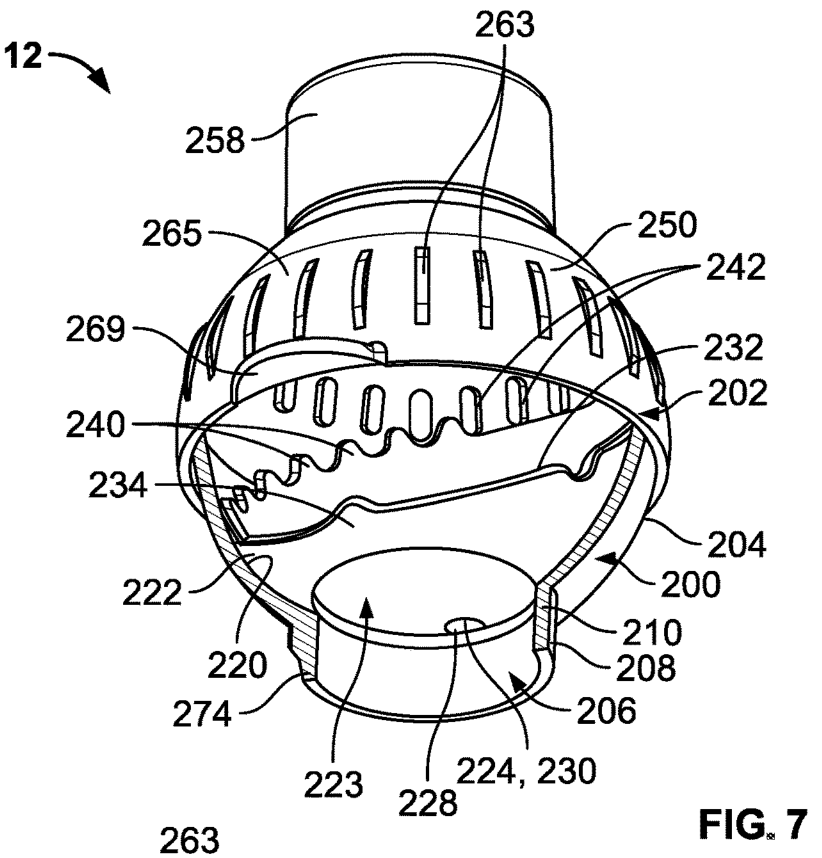
FIG. 7 is a partial cutaway, perspective view of the dispensing capsule of FIGS. 1-4 in an open position.
Figure 8:
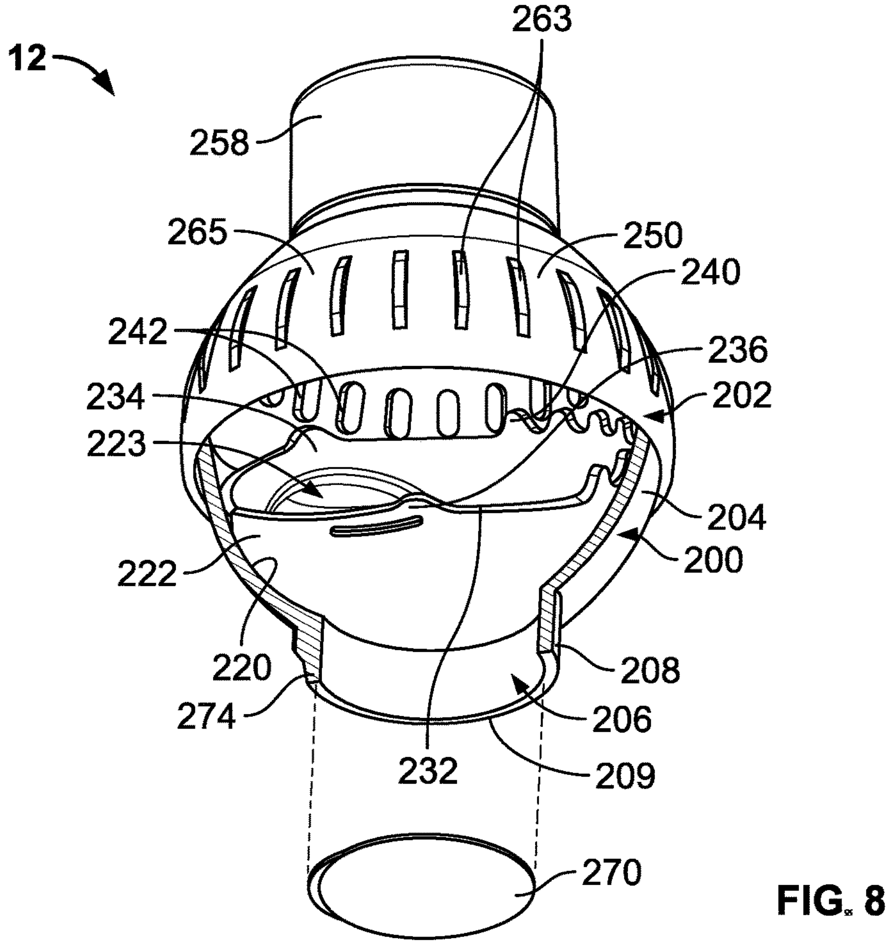
FIG. 8 is a partial cutaway, perspective view of the dispensing capsule of FIGS. 1-4 in a closed position.

The shroud 222 is attached to the interior surface 220 at a single pivot point 224 that is centered at the lower apex of the shroud 222 but is off-center from the lower apex of the lower spherical cap 204, instead positioned at the side of the lower opening 206. Therefore, it is understood that that the shroud 222 is not aligned within lower spherical cap 204 but rather is askew or tilted when placed within the lower spherical cap 204 with the pivot point 224 aligned such that the shroud 222 extends partially outwardly from an upper end of the lower spherical cap 204 as seen in FIGS. 7 and 8.

In one embodiment, the pivot point 224 may be formed by a clearance fit connection, e.g., a notch and hole clearance fit connection where the lower spherical cap 204 contains an outwardly extending post 228 at the pivot point 224 and the shroud 222 contains a corresponding hole 230 at the pivot point 224 which interlock to allow the shroud 222 to pivot with respect to the lower spherical cap 204 about the pivot point 224.

When the shroud opening 223 and lower opening 206 are aligned, powder is permitted to flow into and out of the dispensing capsule 12. As the shroud 222 is pivoted about the pivot point 224, the shroud opening 223 moves away from the lower opening 206 of the lower spherical cap 204 and the shroud 222 progressively covers the lower opening 206 of the lower spherical cap 204 to conceal the lower opening 206 of the lower spherical cap 204.

An outer perimeter edge 232 of the shroud 222 may support first and second outwardly extending projections 234, 236 that engage with a stationary stop block 238 therebetween (seen in FIG. 2) on the interior surface 220 of the lower spherical cap 204. The outwardly extending projections 234, 236 are approximately 90 degrees apart and therefore permit the shroud 222 to pivot approximately 90 degrees, or less than and equal to 90 degrees, between the projections 234, 236 between a first open shroud position and a second closed shroud position.

As seen in FIG. 7, in the first open shroud position, the first outwardly extending projections 234 may contact the stationary stop block 238 (shown in FIG. 2) which is a shroud position that aligns the shroud opening 223 with the lower opening 206 of the lower spherical cap 204.

As seen in FIG. 8, as the shroud 222 is rotated about the pivot point 224, the outer perimeter edge 232 moves along the stationary stop block 238 (shown in FIG. 2) until the stationary stop block 238 contacts the second outwardly extending projection 236 which is the second closed shroud position that aligns the shroud 222 over the lower opening 206, and the shroud opening 223 away from the lower opening 206, to completely cover the lower opening 206 of the lower spherical cap 204.

The outer perimeter edge 232 of the shroud 222 may also support a plurality of outwardly extending gear teeth 240, generally positioned on an opposite end of the outer perimeter edge 232 as the first and second outwardly extending projections 234, 236, and spanning approximately 90 degrees permitting engagement of the gear teeth 240 with corresponding notches 242 in the rotational span of approximately 90 degrees. The outwardly extending gear teeth 240 engage with the corresponding notches 242 of the upper half 202 by slip fit to provide rotation of the shroud 222 by rotating the lower half 200 of the dispensing capsule 12 with respect to the upper half 202 of the dispensing capsule 12, as further described below.

The upper half 202 may comprise a hollow half sphere or upper spherical cap 250 that has an elongated neck 252 extending upwardly to a bottle neck opening 254 supporting an upwardly elongated lip 256 extending upwardly from an upper apex of the upper spherical cap 250 and forming a cylindrical conduit that is received by a twist bottle cap 258. For example, an outer surface of the elongated neck 252 may support outwardly extending threads 259 that selectively receive corresponding outwardly extending threads 261 of an inner surface of the bottle cap 258, as known in the art, in order to selectively close the bottle neck opening 254. The upper half 202 may also comprise an elongated sphere shape or cylindrical shape merging to conform to the shape of the elongated neck 252. In this respect, the upper half 202 may not be a spherical cap but an elongated sphere, cylinder or other shape.

An interior surface 260 of the upper spherical cap 250 may support the inwardly extending notches 242, as described above, which extend longitudinally along the powder flow axis 100 and are spaced apart circumferentially about the interior surface 260 of the upper spherical cap 250 to engage with the outwardly extending gear teeth 240 of the shroud 222 when the lower half 200 and upper half 202 of the dispensing capsule 12 are coupled to each other. In this respect, the inwardly extending notches 242 are spaced apart to receive the outwardly extending gear teeth 240 therebetween in a slip fit connection and therefore the notches 242 and gear teeth 240 interlock to pivot the shroud 222 when the lower half 200 and upper half 202 are rotated with respect to each other. Rotation of the lower half 200 and upper half 202 may be assisted by outwardly circumferentially extending notches 263 on an outer surface 265 of the of the upper spherical cap 250 which may be held by the user's hand.

The lower half 200 and upper half 202 of the powder dispensing capsule 12 are coupled in order to interlock the gear teeth 240 and notches 242 of the lower half 200 and upper half 202, respectively, and to provide a fixed interior volume for holding a predetermined amount of powder. For example, an interior volume of the powder dispensing capsule 12 may hold approximately 50-150 cc and approximately 100 cc of powder.

In one embodiment, the lower half 200 and upper half 202 may be coupled by an annular snap fit connection, e.g., tongue and groove snap fit connection, which positions the gear teeth 240 and notches 242 in interlocking positions but still allows the lower half 200 and upper half 202 to rotate with respect to each other. For example, an outer surface 262 of the lower half 200 may include a circumferentially extending groove 264 at an upper end and an inner surface 266 of the upper half 202 may include a circumferentially tongue 268 at a lower end that is received within the groove 264 by snap fit and still allows the circumferentially tongue 268 to move along the circumferentially extending groove 264. It is understood that other attachment methods between the lower half 200 and upper half 202 are contemplated such as clamps, snap fit, snap rings, compression pins, compression fit, and the like.

Visual indications on the upper half 202 from the lower half 200 may assist with aligning the upper half 202 from the lower half 200 prior to connecting the two halves via annular snap fit connection.

The upper half 202 may support an outwardly extending finger tab 269, extending perpendicular to the axis 100, which assists with separation of the upper half 202 from the lower half 200 by pulling the tab 269 of the upper half 202 away from the lower half 200 along the axis 100.

The lower half 200 may also receive a protective cover 270 (shown in FIG. 8) to selectively enclose a lower end 209 of the downwardly extending lip 208 and thus ensure that powder that leaves the lower opening 206 does not leave the lower half 200. The cover 270 may be attached to the downwardly extending lip 208 by snap fit connection.

Metered Dispensing of Powder

Figure 9:
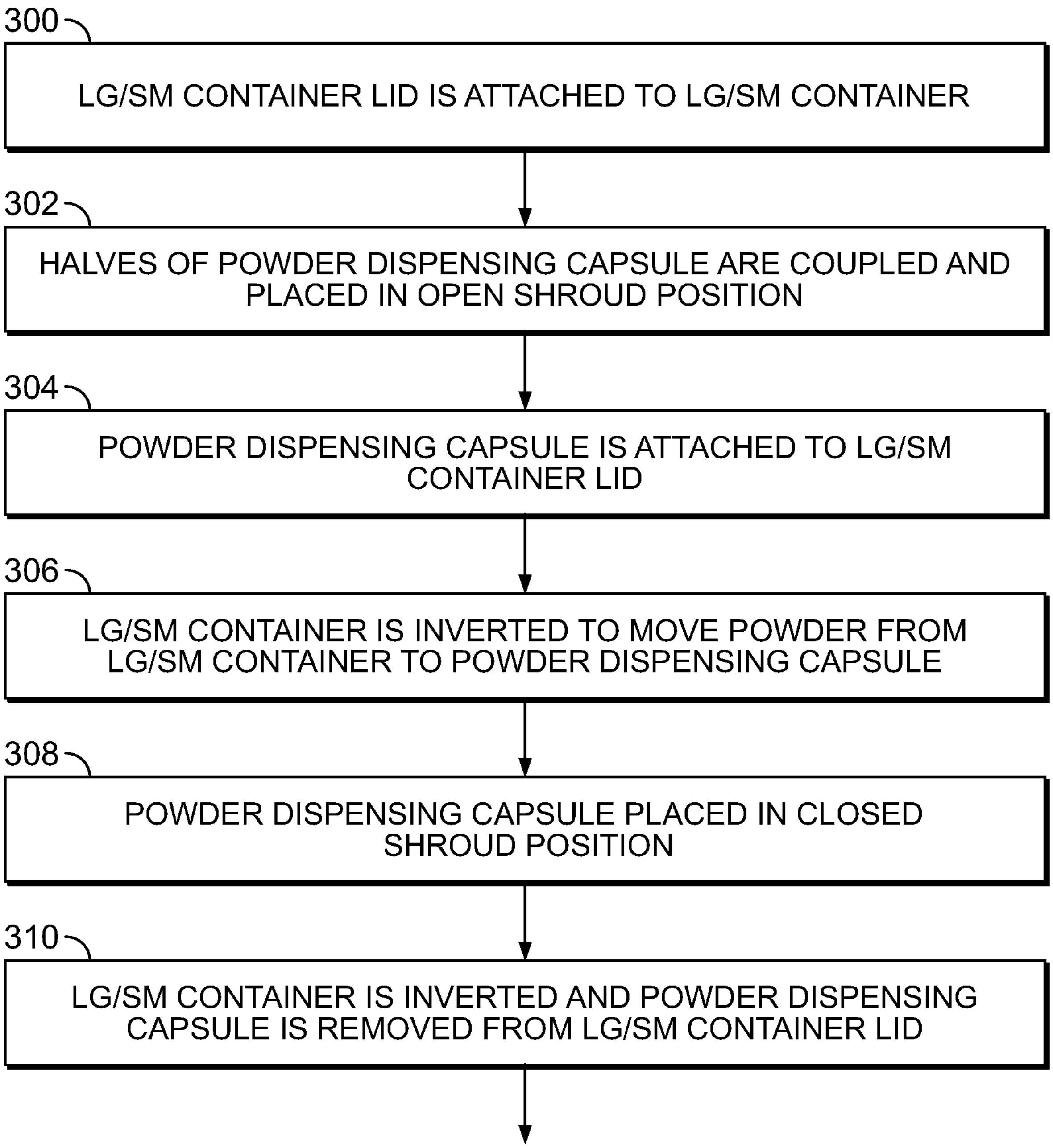
FIG. 9 is a flowchart of the steps of using the dispensing capsule to retrieve powder from the powder tub or smaller container.
Figure 10:
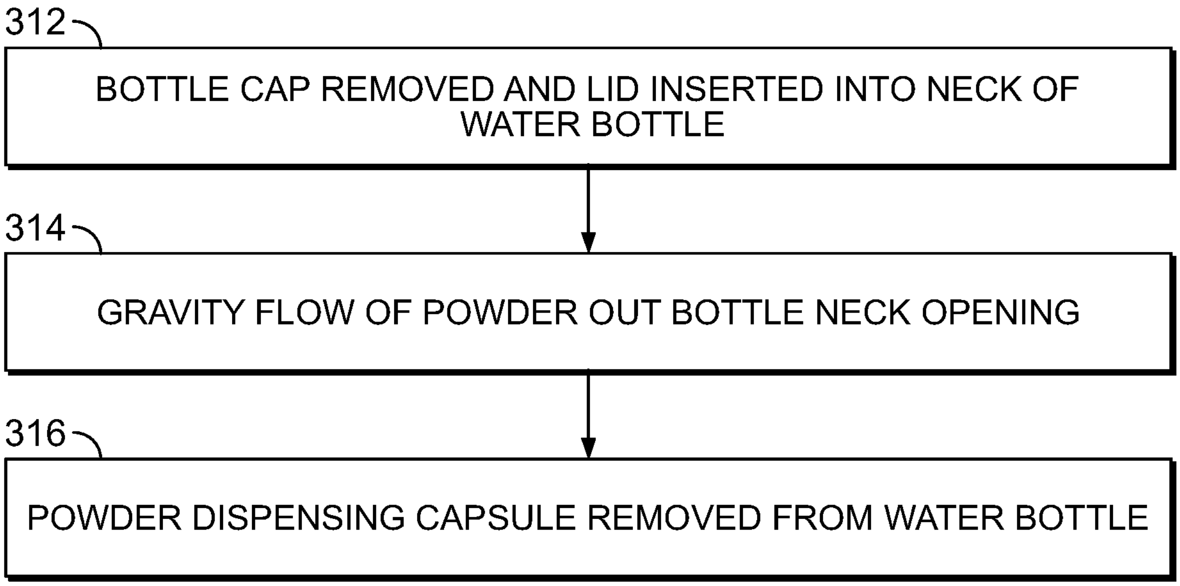
FIG. 10 is a flowchart of the steps of using the dispensing capsule to dispense powder into a narrow neck water bottle.

Referring to FIGS. 9 and 10, a method of using the powder dispensing assembly 10 to dispense powder from the large container 18 into the powder dispensing capsule 12 or from the small travel container 20 into the powder dispensing capsule 12, and then further, from the powder dispensing capsule 12 into a cup, shaker bottle, or standard water bottle may include the following steps. The water bottle may be a commercially available disposable or single use water bottle having a narrow neck and holding a volume of 16.9 oz (500 mL) of liquid.

Referring to FIG. 9, in step 300, the large tub container lid 14 or small container lid 16 is attached to the large container 18 or small travel container 20, respectively, by "screwing on" or "twisting on" the large tub container lid 14 to the large container 18 or the small container lid 16 to the small travel container 20.

In step 302, the upper half 202 and the lower half 200 of the powder dispensing capsule 12 are coupled together and the powder dispensing capsule 12 is placed in the first open shroud position where the lower opening 206 is open. The bottle cap 258 is also screw attached to the bottle opening 254 of the upper half 202 to ensure that powder does not leave the upper half 202.

The large container 18 or small travel container 20 may hold bulk powder. For dispensing. The small travel container 20 may receive powder from the large container 18 prior to filling the powder dispensing capsule 12.

In step 304, the powder dispensing capsule 12 is attached to the large tub container lid 14 or the small container lid 16 by inserting the lower half 200 into the cylindrical tube 38, 138 of the large tub container lid 14 or the small container lid 16, respectively, so that the teeth 212 of the downwardly extending lip 208 and the longitudinally extending notches 54 of the narrower tube 48 interlock and the circumferentially extending groove 274 interlocks with the circumferentially inwardly extending tongue 52, 152 of the narrower tube 48, 148, and the inwardly extending tabs 63 interlock with the circumferentially extending groove 274. The protective cover 43, 143 may be removed from the cylindrical tube 38, 138 when the powder dispensing capsule 12 is attached.

In step 306, the large container 18 or small travel container 20 is inverted or rotated 180 degrees to an inverted position in order to allow powder to flow by gravity from the large container 18 or small travel container 20 into the powder dispensing capsule 12 along the powder flow axis 100. The user may shake the large container 18 or small travel container 20 to assist with the movement of powder to the powder dispensing capsule 12. The sifter 60, 160 may also assist with the movement of powder from the large container 18 or small container.

In step 308, following the filling of the powder dispensing capsule 12 with powder, which may be facilitated by the transparency of the powder dispensing capsule 12, the upper half 202 of the powder dispensing capsule 12 is rotated (e.g., clockwise) with respect to the lower half 200 so that the powder dispensing capsule 12 is placed in the second closed shroud position where the lower opening 206 is closed. Thus, the powder is secured within the capsule.

In step 310, the large container 18 or small travel container 20 is inverted or rotated 180 degrees to an upright position and the powder dispensing capsule 12 is removed from the large container 18 by pressing the opposed release buttons 161 so that the inwardly extending tabs 62 disengage from the circumferentially extending groove 274. The cover 270 may be attached to the lower half 200 of the powder dispensing capsule 12 to ensure that powder does not accidentally spill out of the lower half 200 of the powder dispensing capsule 12. The protective cover 43, 143 may also be attached to the cylindrical tube 38, 138 to cover the upper opening 42, 142.

Referring to FIG. 10, when dispensing the single serving powder contents of the powder dispensing capsule 12 into a standard water bottle, starting with step 312, the bottle cap 258 of upper half 202 is removed from the powder dispensing capsule 12 and the upwardly elongated lip 256 of upper half 202 inserted into the narrow neck of the water bottle or placed in close proximity to the narrow neck of the water bottle to pour the powder. It is understood that the narrow bottle neck opening 254 formed by the upwardly elongated lip 256 assists with the transfer of powder from the powder dispensing capsule 12 to the water bottle even if the upwardly elongated lip 256 is not inserted or fully inserted into the neck of the water bottle by funneling the powder into the narrow neck of the water bottle.

In step 314, powder is permitted to flow by gravity outward from the powder dispensing capsule 12 through the bottle neck opening 254 into the water bottle along the powder flow axis 100. The user may shake the powder dispensing capsule 12 to assist with the movement of powder from the powder dispensing capsule 12 into the water bottle. In some instances, the powder dispensing capsule 12 is placed in the first open shroud position where the lower opening 206 is open to assist with removing tightly packed powder from the powder dispensing capsule 12 by allowing powder to fill the space between the shroud 222 and cover 270 and unpacking the powder to facilitate powder movement.

In step 316, after the powder is substantially removed from the powder dispensing capsule 12, the powder dispensing capsule 12 is removed from the water bottle. Therefore, the predetermined amount of powder has been fully dispensed into the water bottle. The user may then mix the powder and liquid in the water bottle for consumption.

Figure 11:
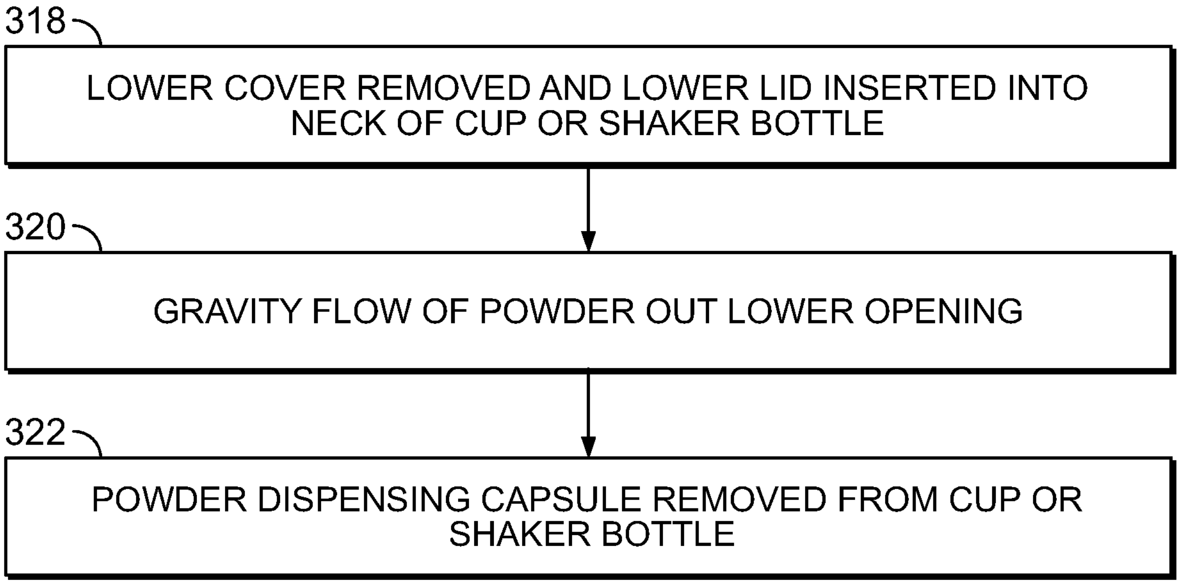
FIG. 11 is a flowchart of the steps of using the dispensing capsule to dispense powder into a wide neck cup or shaker bottle.

Referring to FIG. 11, when dispensing the singe serving powder contents of the filled powder dispensing capsule 12 into a cup or shaker bottle with a wide neck opening, starting with step 318, the cover 270 of lower half 200 is removed and the powder dispensing capsule 12 is placed in the first open shroud position where the lower opening 206 of lower half 200 is open. The downwardly extending lip 208 of lower half 200 is inserted into the wide neck of the cup or shaker bottle or placed in close proximity to the wider neck of the cup or shaker bottle to pour the powder before or after the powder dispensing capsule 12 is placed in the first open shroud position.

In step 320, powder is permitted to flow by gravity outward from the powder dispensing capsule 12 through the lower opening 206 of lower half 200 into the cup or shaker bottle along the powder flow axis 100. The user may shake the powder dispensing capsule 12 to assist with the movement of powder from the powder dispensing capsule 12 into the cup or shaker bottle.

Alternatively, and as similarly described above with respect to FIG. 10, the bottle cap 258 of upper half 202 is removed from the powder dispensing capsule 12 and the upwardly elongated lip 256 of upper half 202 inserted or placed into the wider neck of the cup or shaker bottle or placed in close proximity to the wider neck of the cup or shaker bottle to pour the powder. The powder is permitted to flow by gravity outward from the powder dispensing capsule 12 through the bottle neck opening 254 into the cup or shaker bottle along the powder flow axis 100.

Therefore, powder may flow through either the lower opening 206 or the upper bottle neck opening 254 into the wider neck cup or shaker bottle.

In step 322, after the powder is substantially removed from the powder dispensing capsule 12, the powder dispensing capsule 12 is removed from the cup or shaker bottle. Therefore, the predetermined amount of powder has been fully dispensed into the cup or shaker bottle. The user may then mix the powder and liquid in the cup or shaker bottle for consumption.

It is understood that the present invention contemplates various arrangements of the powder dispensing assembly 10 and methods of use which assist with the removal of powder from a large powder tub or smaller container by using gravity feed and dispensing powder from a premeasured capsule into a water bottle, shaker bottle, cup or other container using gravity feed.

Certain terminology is used herein for purposes of reference only, and thus is not intended to be limiting. For example, terms such as “upper”, “lower”, “above”, and “below” refer to directions in the drawings to which reference is made. Terms such as “front”, “back”, “rear”, “bottom” and “side”, describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms “first”, “second” and other such numerical terms referring to structures do not imply a sequence or order unless clearly indicated by the context.

When introducing elements or features of the present disclosure and the exemplary embodiments, the articles “a”, “an”, “the” and “said” are intended to mean that there are one or more of such elements or features. The terms “comprising”, “including” and “having” are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words “means for” or “step for” are explicitly used in the particular claim.

What we claim is:

1. A powder dispensing assembly comprising:
- a first shell;
- a second shell joinable to the first shell to define a volume and the second shell having a flow opening; and
- a shroud rotatable about a pivot point on the second shell to cover the flow opening in a first position and to reveal the flow opening in a second position
- wherein the shroud has a toothed edge engaging with mating notches on an interior of the first shell.

2. The assembly of claim 1
- wherein
- the shroud is rotatable about a singular pivot point on the second shell with rotation of the first shell with respect to the second shell.

3. The assembly of claim 1 wherein shroud has a shroud opening with a dimension corresponding to a dimension of the flow opening.

4. The assembly of claim 1 wherein a shape of the shroud conforms to an inner surface of the second shell.

5. The assembly of claim 4 wherein the inner surface of the second shell is concave.

6. The assembly of claim 5 wherein the first shell and second shell form a sphere.

7. The assembly of claim 1 wherein the shroud is joined to the second shell by a hole receiving a corresponding peg.

8. The assembly of claim 1 wherein the shroud is confined to rotate less than of or equal to 120 degrees.

9. The assembly of claim 1 wherein an interior of the second shell has opposing stop blocks restraining movement of the shroud.

10. The assembly of claim 1 wherein rotation of the first shell with respect to the second shell rotates the shroud about the pivot point between the first position and second position.

11. A powder dispensing assembly comprising:
- a first shell;
- a second shell joinable to the first shell to define a volume and the second shell having a flow opening;
- a shroud rotatable about a pivot point on the second shell to cover the flow opening in a first position and to reveal the flow opening in a second position;
- a lid of a container having a lid opening and removably receiving the second shell within the lid opening of the lid; and
- release buttons extending outwardly from the lid and pressable to retain and release the second shell from the lid.

12. The assembly of claim 11 further comprising a sifter coupled to a bottom of the lid.

13. A method of dispensing powder comprising the steps of:

providing a powder dispensing assembly comprising a first shell, a second shell joinable to the first shell to define a volume and the second shell having a flow opening, and a shroud rotatable about a pivot point on the second shell to cover the flow opening in a first position and to reveal the flow opening in a second position;

attaching the powder dispensing assembly to a lid of the powder container having a lid opening;

rotating the shroud to the second position to reveal the flow opening;

filling the volume with powder;

rotating the shroud to the first position to cover the flow opening; and pressing release buttons extending outwardly from the lid to release the powder dispensing assembly from the lid.

14. The method of claim 13 further comprising rotating the first shell with respect to the second shell to move the shroud to the second position to reveal the flow opening;

and rotating the first shell with respect to the second shell to move the shroud to the first position to cover the flow opening.

15. The method of claim 13 further comprising:

dispensing powder from the powder dispensing assembly by rotating the shroud to the second position.

* * * * *